United States Patent
Gramelspacher et al.

(10) Patent No.: US 7,587,121 B1
(45) Date of Patent: Sep. 8, 2009

(54) METHOD AND SYSTEM FOR MULTIPLE FIELD MODULATION

(75) Inventors: Michael S. Gramelspacher, St. Louis, MO (US); Christopher E. Chupp, St. Louis, MO (US); Yousri H. Barsoum, St. Louis, MO (US); Jesse J. Chounard, II, Ballwin, MO (US); Michael C. Reynolds, Ballwin, MO (US)

(73) Assignee: Koplar Interactive Systems International, L.L.C., St. Louis, MO (US)

(*) Notice: Subject to any disclaimer, the term of this patent is extended or adjusted under 35 U.S.C. 154(b) by 861 days.

(21) Appl. No.: 10/969,708

(22) Filed: Oct. 20, 2004

Related U.S. Application Data

(60) Provisional application No. 60/513,651, filed on Oct. 23, 2003.

(51) Int. Cl.
*H04N 5/91* (2006.01)
(52) U.S. Cl. .......................... 386/46; 386/94
(58) Field of Classification Search .................. 386/46, 386/48, 94
See application file for complete search history.

(56) References Cited

U.S. PATENT DOCUMENTS

| | | | |
|---|---|---|---|
| 4,807,031 A | 2/1989 | Broughton et al. | |
| 5,594,493 A | 1/1997 | Nemirofsky | |
| 5,748,733 A * | 5/1998 | Quan | 380/204 |
| 6,094,228 A | 7/2000 | Ciardullo et al. | |
| 6,229,572 B1 | 5/2001 | Ciardullo et al. | |
| 6,661,905 B1 | 12/2003 | Chupp et al. | |
| 2002/0112250 A1 | 8/2002 | Koplar et al. | |
| 2002/0183102 A1 | 12/2002 | Withers et al. | |

OTHER PUBLICATIONS

Davidson, Paul. (Fri Oct. 17, 8:20 AM ET) Rules Would Require Recorders to Encrypy TV Shows, USA Today, Database <online>. Available web site: http://story.news.yahoo.com/news?tmpl=story&cid=677&ncid=677&e=7&u=/usatoday/20031017/bs . . . Last update: Fri Oct. 17, 2003 Accessed on: Oct. 17, 2003.

Ramer, Dan., What the Heck is 3:2 Pulldown? Database <online>. Available web site: http://www.dvdfile.com/news/special_report/production_a_z/3_2_pulldown.htm Last update: Oct. 16, 2003 Accessed on: Oct. 17, 2003.

Steward, Alan. 2-3 Pulldown Explained. Database <online>. Available web site: http://www.zerocut.com/tech/pulldown.html Accessed on: October 17, 2003.

* cited by examiner

*Primary Examiner*—Thai Tran
*Assistant Examiner*—Mishawn Dunn
(74) *Attorney, Agent, or Firm*—Polsinelli Shughart PC

(57) ABSTRACT

A system for selectively increasing and decreasing the intensity of scan lines in a plurality of fields of a video signal over a time interval and not increasing or decreasing the intensity of the video scan lines in the remaining plurality of frames, thereby enabling a decoder to use an average intensity value comparison or to accumulate the differences in signal strength when fields are changing state from encoded to unencoded or encoded to unencoded to determine whether an auxiliary signal is present during the time interval.

19 Claims, 13 Drawing Sheets

METHOD AND SYSTEM FOR MULTIPLE FIELD MODULATION

CROSS-REFERENCE TO RELATED APPLICATION

This application claims the benefit of U.S. Provisional Patent Application entitled "Method and System for Multiple Fields Encoding of Carrier Signals", Ser. No. 60/513,651, Filed 23 Oct. 2003 by Michael S. Gramelspacher, Christopher E. Chupp, Yousri H. Barsoum, Jesse J. Chounard II and Michael C. Reynolds which is herein incorporated by reference.

BACKGROUND OF THE INVENTION

The present invention relates to a method for detecting a modulated video signals, and more particularly for a method for detecting the presence of an auxiliary signal within a modulated video signal for signaling purposes.

Various methods exist in the art for transmitting an auxiliary signal along with video signals, wherein the auxiliary signal is used for a variety of signaling purposes. Several of these methods transmit the auxiliary signal in the video signals by replacing active portions of the video signal with auxiliary data, such that users who view the video signal on their display devices (e.g., televisions) will see the effect of the auxiliary signal in the form of an icon, dot or other visual image or disturbance in the picture. Other methods transmit auxiliary signals in non-viewable scan lines of the video signal, such as in the vertical blanking interval (VBI). However, these scan lines may already contain other auxiliary signals such as signals that represent cueing information, timing information or closed captioning information and are prone to being stripped by programming operators prior to broadcast.

Another method for transmitting an auxiliary signal in video signals is described in U.S. Pat. No. 4,807,031 to Broughton et al. ("Broughton") entitled "Interactive Video Method and Apparatus", which relates generally to in-band video broadcasting of commands and other encoded information to interactive devices and is incorporated by reference herein. The invention described therein relates generally to interactive educational and entertainment systems, and is described in one embodiment in the context of television program control of toys located where there is a television receiver, as within a residence.

To encode control data, Broughton discloses a novel method of luminance or chrominance modulation of a video signal that creates a composite video signal, wherein the video signal is modulated with control data. The novel modulation method alternately raises and lowers the luminance/chrominance of paired adjacent horizontal scan lines to create a video subcarrier that contains the control data.

In Broughton, the video signal is not being replaced with other data, nor is the data being added as a separate signal along with the video signal. Rather, the video signal itself is modulated to carry the control data. Therefore, the control data is a part of, or contained within, the video signal and yet is imperceptible to the human eye and relatively invisible. The encoding method also includes preview and remove circuitry to ensure suitability or the presence of data encoding and removal of data encoding, respectively.

The control data is transmitted either by television broadcast means, or by pre-recorded video players that are connected to a video display. The control data is then received by the video display where at least one video field of the video display is modulated by control data. The control data is then detected with either opto-electronic or radio frequency (RF) detection means that discriminate between the program material and the control data to detect the control data. The detected control data is further reproduced so that the control data can be used with an interactive device.

Improvements on the method of modulation described in Broughton are described in U.S. Pat. No. 6,094,228 to Ciardullo et al. and U.S. Pat. No. 6,229,572 to Ciardullo et al. (referred to collectively herein as "Ciardullo"). Both Ciardullo patents describe improved methods of modulation wherein the auxiliary data is inserted on the visual portion of a video signal by changing the luminance of paired scan lines in opposite directions. Instead of raising and lowering the intensity on the whole line as in Broughton, Ciardullo uses pseudo noise sequences to raise and lower the intensity on portions of a first line, where the line paired to the first line is modulated with the inverse pseudo noise sequences. Ciardullo thereby allows larger amounts of auxiliary data to be modulated in the video signal by use of the pseudo noise sequences. Broughton and Ciardullo, which are owned by the assignee of the present invention, are incorporated by reference herein.

Still another patent application by the assignees of the present invention is U.S. patent application entitled "Method and Apparatus for Modulating a Video Signal With Data", Ser. No. 10/676,940, filed on Oct. 1, 2003, of Yousri H. Barsoum, Alan G. Maltagliati, Daniel A. Ciardullo and Christopher E. Chupp (the application being herein referred to as "Barsoum"), which is incorporated by reference herein. Barsoum describes the use of a memory card coupled to a slotted hand-held device for receiving video signals modulated with carrier signals by use of the memory card, transmitting the signals from the card to the slotted hand-held device, detecting the carrier signals or decoding auxiliary data from the video signals on the slotted hand-held device and providing the user of the slotted hand-held device with a benefit from the detection of the carrier signals and/or the reception of the auxiliary data. Barsoum also describes a method of improving the reliability and speed of the transmission and reception of auxiliary data by storing data in video frames split into multiple regions and encoding complementary data bits in each region.

Still another patent application by the assignees of the present invention is U.S. patent application entitled "Method And System of Detecting Signal Presence from a Video Signal Presented on a Digital Display Device", Ser. No. 10/817,109, filed on Apr. 2, 2004, of James G. Withers, Yousri H. Barsoum, Edward J. Koplar and Michael C. Reynolds (the application being herein termed "Withers II"), which is incorporated by reference herein. Withers II describes several methods and apparatus for modulating video signals with signal presence and signal absence for use on digital display devices.

Yet another patent application by the assignees of the present invention is U.S. patent application entitled "Method and System for Enhanced Modulation of Video Signals", Ser. No. 10/888,919, filed on Jul. 9, 2004, of Christopher E. Chupp, Michael S. Gramelspacher, Jesse J. Chounard II, James G. Withers, Yousri H. Barsoum and Michael C. Reynolds (the application being herein termed "Chupp"), which is incorporated by reference herein. Chupp describes a method and apparatus for determining an optimum level and placement of a carrier signal (i.e., an auxiliary signal) to be modulated into an active portion of a video signal so as to deter nefarious third parties from stripping the carrier signal out of the video signal and increase the detectability of the carrier signal within the video signal without noticeably decreasing the clarity of a picture represented by video signal to a viewer.

Yet another application by the assignees of the present invention is U.S. Utility Patent Application entitled "Methods for Improved Modulation of Video Signals", Ser. No. 10/958,865 filed on Oct. 4, 2004, of Michael C. Reynolds, James G. Withers, Yousri H. Barsoum, Jesse J. Chounard II and Edward J. Koplar (the application being herein termed "Reynolds"), which is incorporated by reference herein. Reynolds discloses optical improvements for increasing the detectability and reducing the visibility of carrier signals.

At the time of the present invention, analog display devices (e.g., NTSC televisions) operate by use of a fine pitch electron beam that strikes phosphors coating on an internal face of the cathode ray tube (CRT). The phosphors emit light of an intensity which is a function of the intensity of the beam striking it. A period of 1/60 second is required for the electron beam to completely scan down the CRT face to display a field of the image. During the following 1/60 second, an interlaced field is scanned, and a complete frame of video is then visible on the analog display device. The phosphors coating on the face of the tube is chemically treated to retain its light emitting properties for a short duration. Thus, the first area of the scanned picture begins to fade just as the electron beam retraces (i.e., during the vertical retrace) to the top of the screen to refresh it. Since the electron beam covers 525 lines 30 times per second, a total of 15,750 lines per second is viewed each second.

The Broughton method of modulating video signals to create an auxiliary signal and its improvements were generally intended for use with analog display devices. The Broughton method relies on the interlaced scanning process during video signal transmission. Upon receiving the video signal from the signal source, the display device splits the video signal into sequentially transmitted images referred to as frames, whereby each frame of an NTSC television image has 525 horizontal scan lines. The display device scans 262.5 of the horizontal lines left to right and top to bottom by skipping every other line, thus completing the scan of a first field, and then retracing to the top of the image and scanning the remaining 262.5 lines, for a second field. The fields are interlaced at the display device and construct one complete frame. When the video signal is broadcast at 525 lines per frame and 30 frames a second there are 60 fields per second and a line frequency rate (i.e., the speed at which lines are refreshed) of 15,750 Hz (i.e., approximately 16 kHz).

The use of Broughton and other methods of modulating video signals to contain an auxiliary signal may be undesirable in embodiments where the broadcast source is from a computer. When video signals are digitally encoded in a video file or stream and are played back by use of a computer, the scan lines of a first field of a frame of the video signal may become blended with the video scan lines of a second field of the frame such that the auxiliary signal in the first field is smeared between the two fields. If the intensity of the second field is used as a reference with the intensity of the first field, a comparison of the two may return erroneous results.

There is a need in the art for a system that selectively increases and decreases the intensity of video scan lines in a plurality of fields of a video signal over a time interval and does not increase or decrease the intensity of the video scan lines in the remaining plurality of fields, thereby enabling a decoder to use an average intensity value of the nonencoded fields as a reference with the average intensity value of the encoded fields, or to accumulate the differences in signal strength when fields are changing state from encoded to unencoded or encoded to unencoded to determine whether an auxiliary signal is present during the time interval.

SUMMARY OF THE INVENTION

In brief summary, the present invention overcomes and substantially alleviates the deficiencies in the prior art by providing a system for encoding and detecting an auxiliary signal in a modulated video signal over a plurality of fields.

A video signal is transmitted from a signal source to an encoder. An operator interacts with the encoder to control operation of the encoder. An auxiliary signal is then selectively encoded by the encoder in the video signal over a time interval by the operator for signaling purposes, such as to signal a signal absence or signal presence for desired durations in the video signal. Upon modulating the video signal, the encoder outputs a modulated video signal comprised of the video signal and the auxiliary signal. The modulated video signal is then provided to a broadcast source for distribution to an end user who will view the program.

A broadcast source provides a modulated video signal to a detector. The detector determines whether an auxiliary signal is present in the modulated video signal over a time interval in a first embodiment by comparing the average intensity value of fields where the scan lines have increases or decreases in their intensity versus the average intensity value of fields where the video scan lines are unaltered. If the average intensity value of the fields with modified scan lines is significantly higher than the average intensity value of the fields without alteration, then the decoder provides notification of a signal presence during the time interval to a signaled device. If the auxiliary signal is determined not to be present during the time interval, then the detector transmits a signal absence. The signaled device is preferably any device which is capable of receiving and utilizing one or more signal absences or signal presences, such as to indicate the presence or absence of copy control information in a video recording.

In a preferred embodiment of the foregoing, the detector accumulates the absolute value of the difference in signal strength between prior and current fields where there are significant changes in intensity, and once a threshold level of intensity is met then the detector reports a signal presence. If during the time interval the detector does not reach the threshold level of intensity, then at the end of the time interval the decoder reports a signal absence.

The detector continuously outputs the modulated video signal via its digital output or via its analog video output after the signal is converted back to analog. After the expiration of the time interval, an auxiliary signal indicator of the detector signals whether the auxiliary signal was present during the time interval.

Additional advantages and novel features of the invention will be set forth in the description which follows, and will become apparent to those skilled in the art upon examination of the following more detailed description and drawings in which like elements of the invention are similarly numbered throughout.

DETAILED DESCRIPTION OF THE INVENTION

Figure 1:
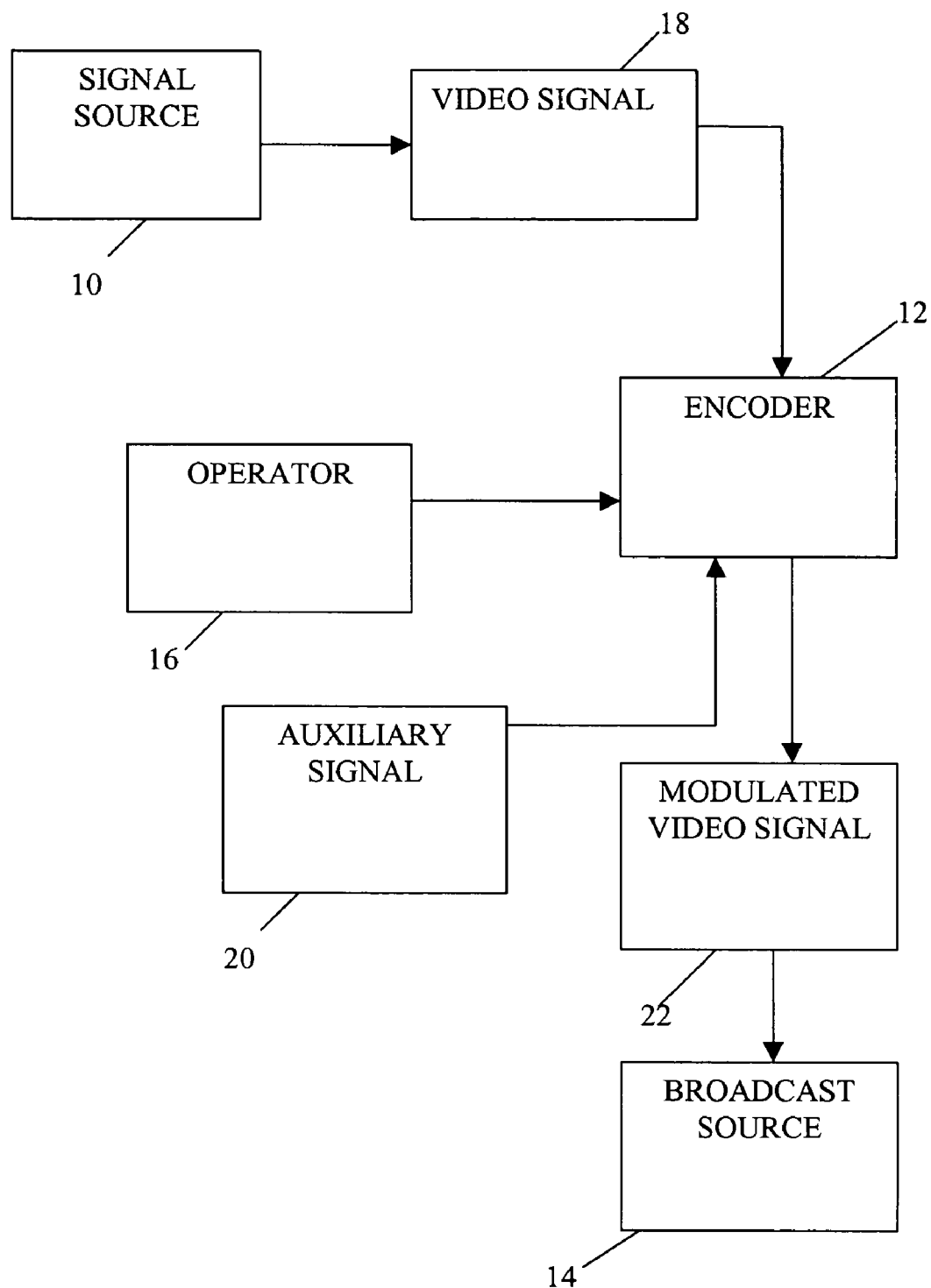
FIG. 1 is a block diagram of encoding components of the present invention.

Referring to the drawings, the preferred embodiment of the system for modulating multiple fields of a video signal for signaling purposes of the present invention is illustrated in FIGS. 1-13.

Referring to FIG. 1, a video signal 18 is transmitted from a signal source 10 to an encoder 12. Video signal 18 is preferably an analog video signal in NTSC (National Television Standards Committee) format, but may be other video signals or video signal formats compatible with the present invention as will be appreciated in the art of video. Signal source 10 is typically a professional grade video tape player with a video tape containing a video program, but may be other media sources including a camcorder or a digital versatile disc (DVD) player with a DVD video containing a video program. Encoder 12 is described in greater detail below.

Operator 16 interacts with encoder 12 to control operation of encoder 12. Preferably, operator 16 is a person that interacts with encoder 12 through the use of a computer or other electronic control device. However, operator 16 may consist entirely of a computer or other electronic control device that directs operation of encoder 12 in an automated manner.

An auxiliary signal 20 is selectively modulated within video signal 18 by encoder 12 over a time interval by operator 16 for signaling purposes, such as to indicate a signal presence or signal absence for desired durations in video signal 18. Upon modulating video signal 18, encoder 12 outputs a modulated video signal 22 comprised of video signal 18 and subliminally encoded auxiliary signal 20. The process of modulating video signals 18 is described in greater detail below.

Modulated video signal 22 is provided to a broadcast source 14 for distribution to an end user who will view the video program associated with modulated video signal 22. Broadcast source 14 provides the video program to one or more end users by means of digital storage media or transmission source including DVD video, video tapes, television broadcast stations, cable or satellite sources or wireless sources that broadcast or otherwise transmit video programs. Preferably, broadcast source 14 is DVD media.

Figure 2:
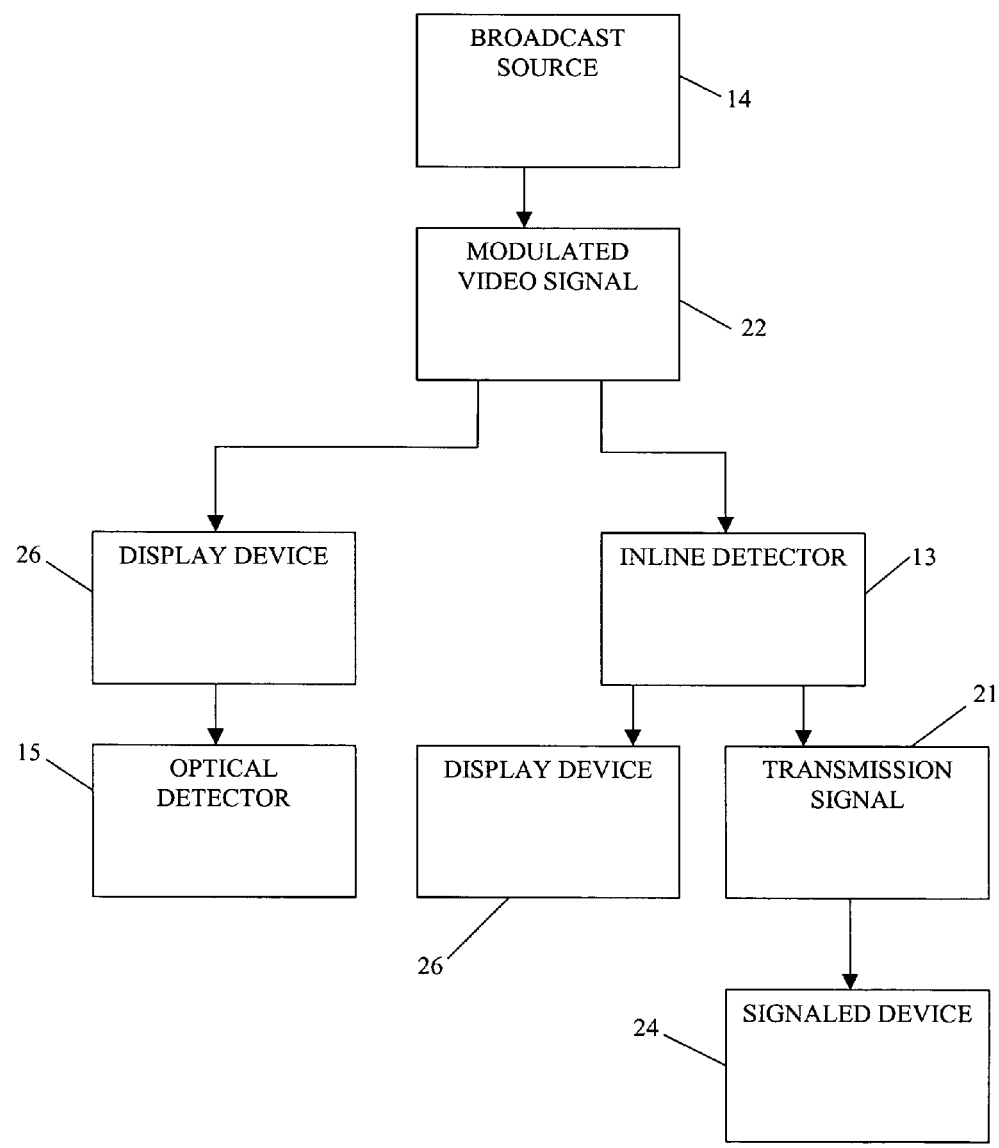
FIG. 2 is a block diagram of detecting components of the present invention.

Referring to FIG. 2, broadcast source 14 provides modulated video signal 22 to a device capable of detecting modulated auxiliary signal 20 such as an inline detector 13 or an optical detector 15. As discussed in greater detail below, the detector determines whether auxiliary signal 20 is present in modulated video signal 22 over a specified or predetermined time interval. When auxiliary signal 20 is suitably present, the detector provides indication of the presence of auxiliary signal 20 to a signaled device 24 by providing it with a signal presence. When auxiliary signal 20 is not suitably present the detector transmits a signal absence to signaled device 24, unless signaled device 24 is integral with the detector such that the detector can directly make use of the signal absence or signal presence.

Signaled device 24 is preferably a device which is capable of receiving and utilizing one or more signal absences (e.g., auxiliary signal 20 not suitably present) and signal presences (e.g., auxiliary signal 20 suitably present), such as a digital video recorder that uses the signal absences and signal presences to flag the checking of permissions to enable playback or recording of a video program.

Inline detector 13 provides the signal absences and signal presences to signaled device 24 by use of a transmission signal 21. Transmission signal 21 may comprise a wireless radio frequency, infrared and direct wire connection as well as other types of signals that may be sent and received.

Display device 26 receives modulated video signal 22 either directly from broadcast source 14 or indirectly from inline detector 13. Display device 26 is preferably a digital video recorder, but may also be other devices capable of presenting and/or recording video signals 18 such as an analog or digital television. It should further be appreciated that display device 26 and signaled device 24 may be combined into a single unit.

As an alternative to inline detector 13, optical detector 15 does not receive transmission signal 21 but rather optically receives modulated video signal 22 directly from display device 26. Because of the capability of optical detection, optical detector 15 is preferably a hand-held device and is described in greater detail below.

Figure 3:
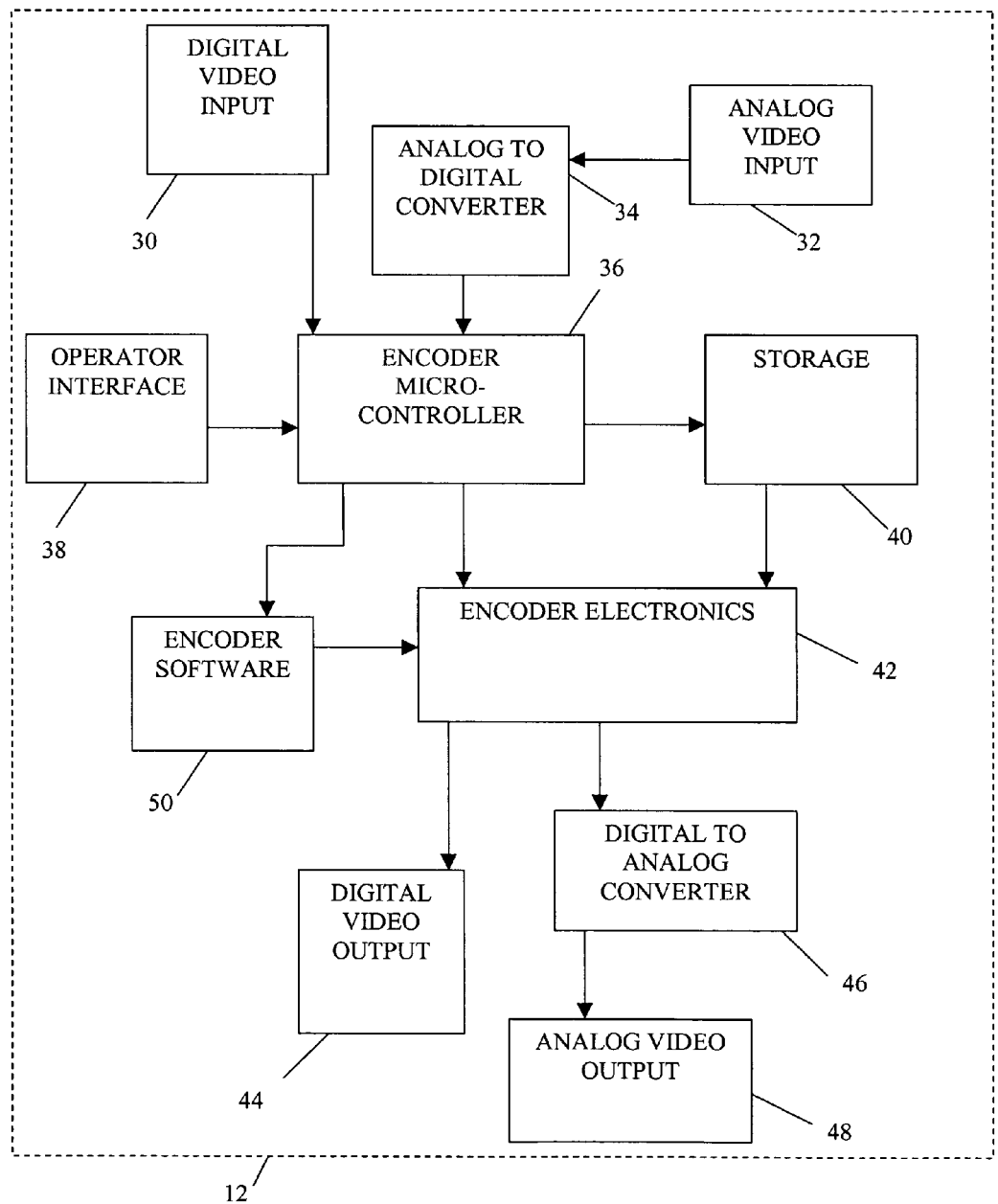
FIG. 3 is a block diagram of an encoder of the present invention.

Referring to FIG. 3, a representative embodiment of encoder 12 is shown to first comprise an encoder microcontroller 36 consisting of more than one processor and/or microprocessor to manage the various processing and input/output of the present invention, but preferably consists of a single processor. Encoder 12 further comprises a digital video input 30 that is capable of receiving video signal 18 from signal source 10 and passing it to encoder micro-controller 36. However, encoder 12 may receive an analog video signal 18 via analog video input 32 and analog to digital converter 34. Analog to digital converter 34 digitizes the analog video signal 18 according to known techniques such that it may be provided to encoder micro-controller 36 for use with the present invention.

An operator interface 38 is electrically connected to encoder micro-controller 36 and provides encoder microcontroller 36 with instructions of where, when and at what magnitude encoder 12 should selectively raise and lower the intensity of scan lines of video signal 18 or portions thereof at the direction of operator 16. Preferably, such instructions are received by operator interface 38 via a serial port. However it should appreciated in the art of computer hardware that other device interconnects of encoder 12 are contemplated including via universal serial bus (USB), "Firewire" protocol (IEEE 1394), and various wireless protocols. In an alternate embodiment, operator interface 38 may be implemented by and made integral with encoder software 50.

When encoder micro-controller 36 receives operator instructions and video signal 18, encoder software 50 manages further operation of encoder 12 and directs encoder micro-controller 36 to store the chrominance information (and/or luminance information as desired) of video signal 18 in storage 40. Storage 40 has the capacity to hold and retain signals (e.g., fields of video signal 18 and corresponding audio signals) in a digital form for access by a processor. Storage 40 may be primary storage and/or secondary storage, and preferably comprises both memory and hard disk drive.

Encoder electronics 42 at the direction of encoder software 50 and encoder micro-controller 36 consist of various electrical components of the encoders of Broughton and/or its improvements not otherwise shown in FIG. 3 to modulate the luminance of video signal 18 and thereby create modulated video signal 22 containing auxiliary signal 20. The resulting modulated video signal 22 is then sent digitally from encoder 12 by digital video output 44, or in analog form by converting the resulting digital signal with digital to analog converter 46 and outputting modulated video signal 22 by analog video output 48. However, it should be appreciated that encoder 12 (and inline detector 13 as described below) need not comprise both digital video input 30 and digital video output 44 in combination with analog video input 32 and analog video output 48, and that one selection of inputs and outputs may be selected.

The specific electronics and software used by encoder 12 may differ when its technology is included in a pre-existing device such as opposed to a stand alone custom device. Encoder 12 may comprise varying degrees of hardware and software, as various components may interchangeably be used.

Figure 4:
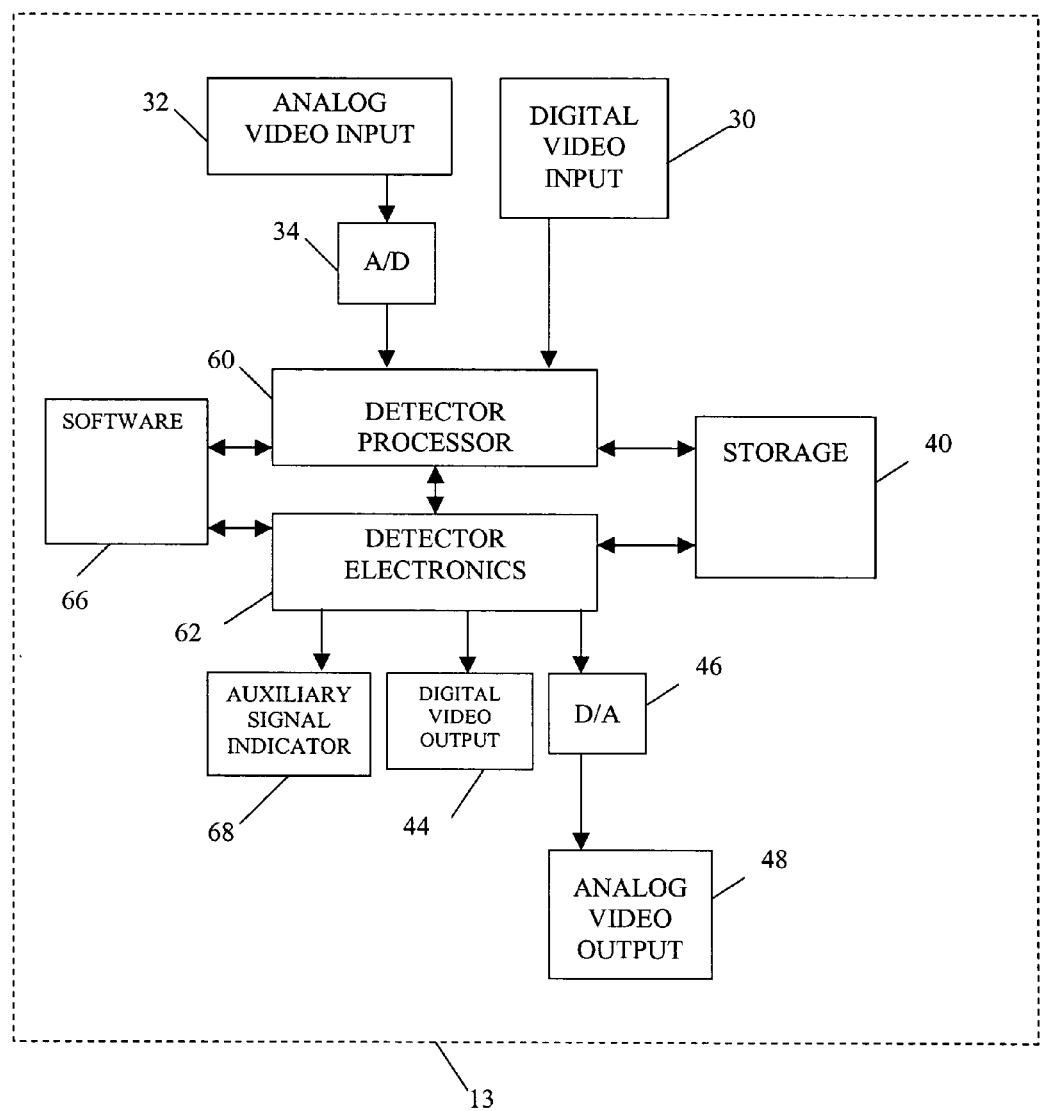
FIG. 4 is a block diagram of an inline detector of the present invention.

Referring to FIG. 4, a representative embodiment of the preferred type of detector is shown as inline detector 13. Inline detector 13 receives modulated video signal 22 from broadcast source 14 by analog video input 32 when modulated video signal 22 is analog, and by digital video input 30 when modulated video signal 22 is digital. Digital video input 30 directly passes modulated video signal 22 to detector processor 60, while analog video input 32 digitizes modulated video signal 22 by use of analog to digital converter 34 before passing modulated video signal 22 to detector processor 60. Analog video input 32 and digital video input 30 are therefore two examples of video signal input means of the present invention.

In the preferred embodiment, detector processor 60 stores the chrominance of modulated video signal 22 in storage 40 while detector electronics 62 detect scan lines or portions thereof that have increased or decreased intensity. The preferred embodiment of the detection scheme used with the present invention is described below.

Signal presences and signal absences are transferred from inline detector 13 to signaled device 24 by auxiliary signal indicator 68. Inline detector 13 also outputs modulated video signal 22 in digital format via digital video output 44, and modulated video signal 22 in analog format by first converting modulated video signal 22 from the digital to analog format by use of digital to analog converter 46, and then outputting modulated video signal 22 via analog video output 48.

Figure 5:
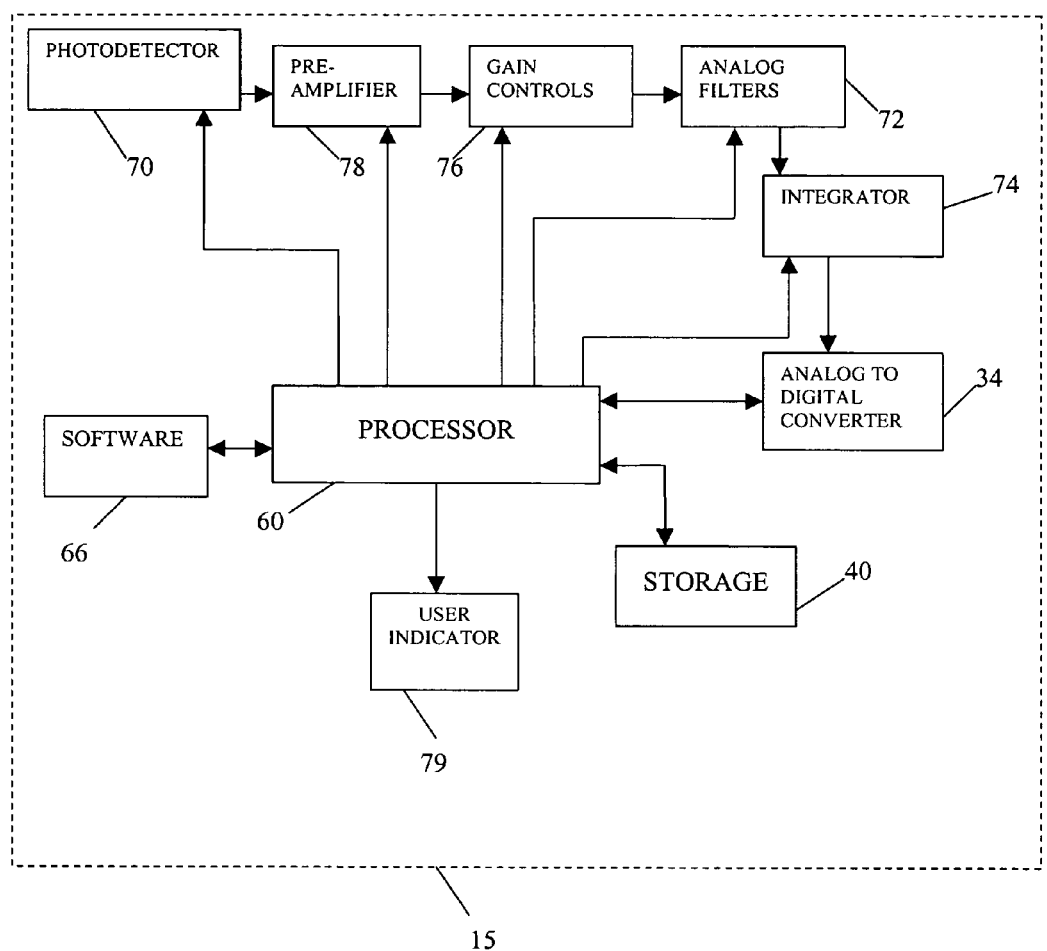
FIG. 5 is a block diagram of an optical detector of the present invention.

Referring to FIG. 5, another means for detecting auxiliary signal 20 is shown to comprise optical detector 15 that comprises various components of signaled device 24 along with detector processor 60 and storage 40 which function as previously described above. Optical detector 15 further comprises photodetector 70, which is electrically coupled to detector processor 60 and capable of optically receiving modulated video signal 22 directly from display device 26. Photodetector 70 in another examples of a video signal input means of the present invention.

Pre-amplifier 78 and gain controls 76 are electrically coupled to detector processor 60 and together amplify modulated video signal 22 by changing the feedback of control gain of feedback circuit. Detector processor 60 controls the amount of gain provided to the circuit. Pre-amplifier 78 and gain controls 76 are used with optical detector 15 as the distance and intensities received from display device 26 may vary. Accordingly, when the strength of modulated video signal 22 is low, optical detector 15 may add gain so that a better reading of modulated video signal 22 is possible.

Analog filters 72 are electrically coupled to detector processor 60 to provide a low pass filter that removes the high frequency noise from modulated video signal 22 by eliminating all frequencies above a preset level and cleans the signal below a frequency by discarding the undesired signal.

Integrator 74 is electrically coupled to detector processor 60 and detects and measures modulated video signal 22. Optional user indicator 79 is further electrically coupled to detector processor 60 and provides a visual and/or audio means to provide user of optical detector 15 with feedback, which may by way of example include notice of availability of promotional opportunities based on the receipt of auxiliary signals 20.

Figure 6:
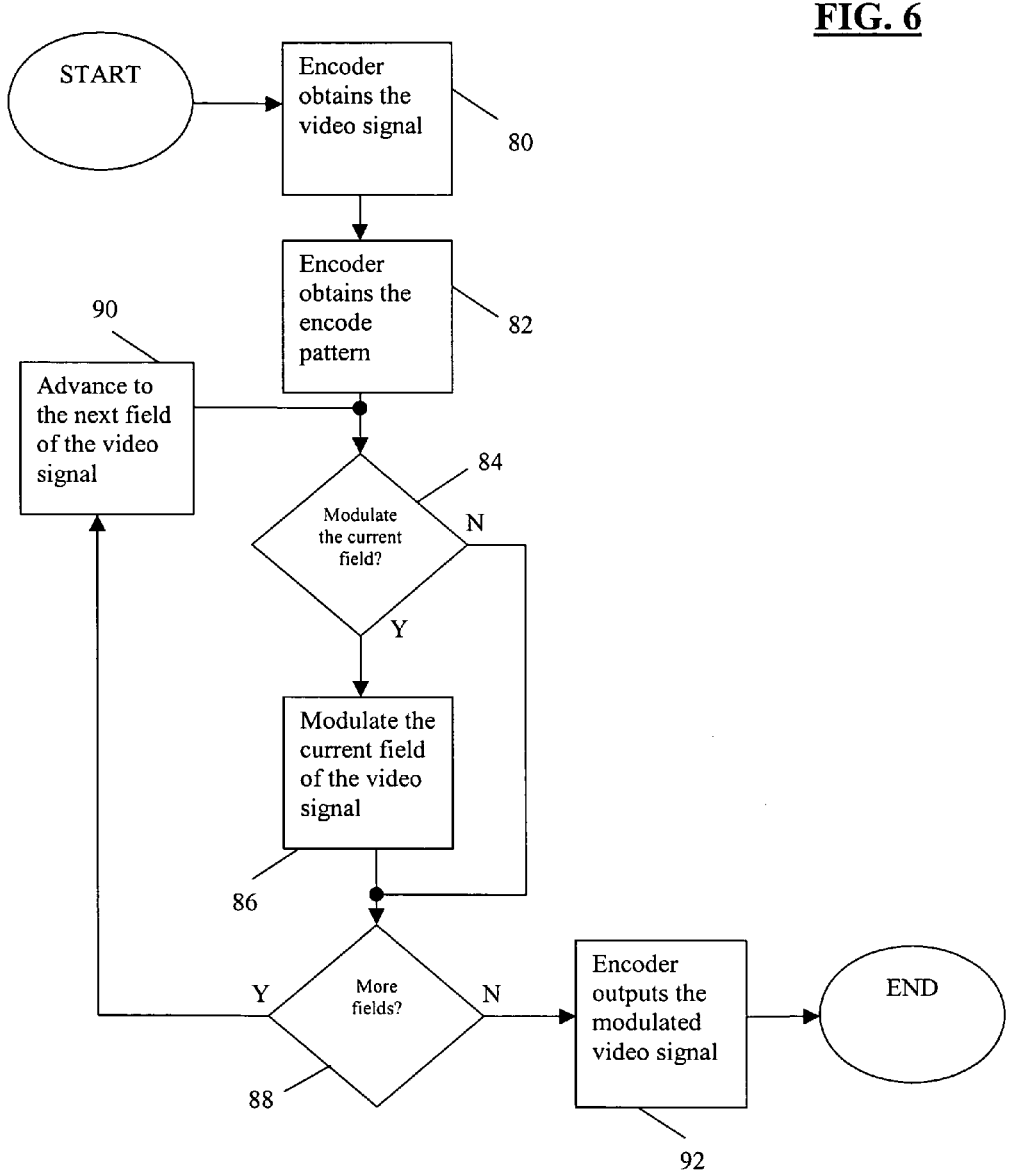
FIG. 6 is a flow chart of a general encoding method of the present invention.

Referring to FIG. 6, encoder 12 obtains video signal 18 from signal source 10 at step 80. Thereafter, encoder 12 at step 82 obtains the encode pattern, which defines the total number of fields to be encoded (i.e., a time interval for encoding) and which fields during the encoding pattern are to be encoded. The encoder pattern may be defined by operator 16, or may be read by encoder 12 from storage 40. During the time interval, preferably half of the fields have video scan lines with altered intensity and the remaining half are unmodified. However, the exact number and order of the fields to be encoded during the time interval does not alter the decoding process. It should be appreciated that the time interval may be relatively short such as one minute long, but may be longer or shorter as desired or needed for particular applications.

Encoder 12 at decision point 84 determines whether to modulate the current field of video signal 18 according to the encoding pattern. If no, encoder 12 skips step 86 and advances to decision point 88. If yes, encoder 12 at step 86 modulates the current field of video signal 18. Preferably, encoder 12 modulates the current field with the method described in Chupp such that a significant amount of high/low or low/high changes in adjacent scan lines in the field creates sufficient line to line differences such that inline detector 13 or optical detector 15 will recognize the field as having had intensity added to and removed from its scan lines.

As disclosed in Chupp, a line to line difference signifies that there is a noticeable amount of added intensity present in one of a pair of adjacent lines in a field. Detectability of such line to line differences is increased when the voltage is increased on lines and decreased lines that are adjacent to each other, such that the resulting comparison of the scan lines reveals an unnatural change in overall intensity between two adjacent scan lines. Although the natural appearance of the video program without encoding may provide a limited amount of signal differences, this amount is used as a reference during the comparison of the average intensity value of encoded fields against unencoded fields as further described below.

Encoder 12 at decision point 88 determines whether there are fields remaining in the encode pattern. If yes, encoder 12 advances to the next field of video signal 18 at step 90 and returns to decision point 84. If no, encoder 12 provides the resulting modulated video signal 22 to broadcast source 14 thereby completing the preferred encoding process of the present invention.

Figure 7:
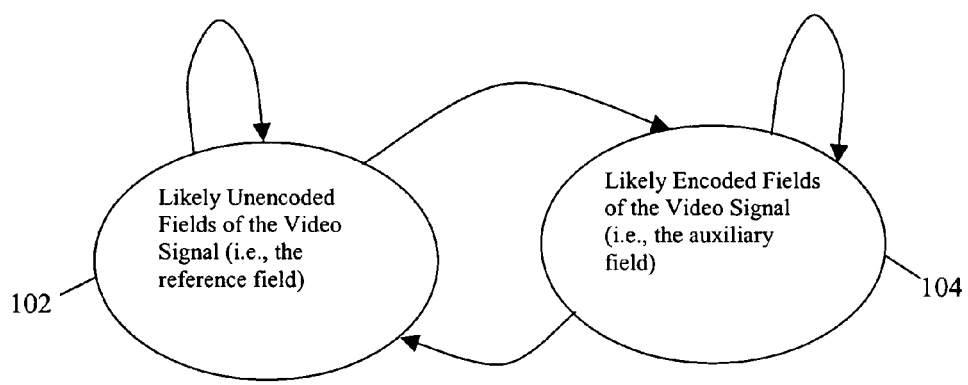
FIG. 7 is a state machine for the detection methods of the present invention.

Referring to FIG. 7, the preferred embodiment of a state machine of the present invention is shown to first comprise a detection state 100, which defines whether the detector determines that is currently detecting a field that it is likely encoded (i.e., an auxiliary field 104), or a field that is likely unencoded (i.e., a reference field 102). Accordingly, the detector may be set to either the reference field 102 or the auxiliary field 104 as described in greater detail below.

Figure 8:
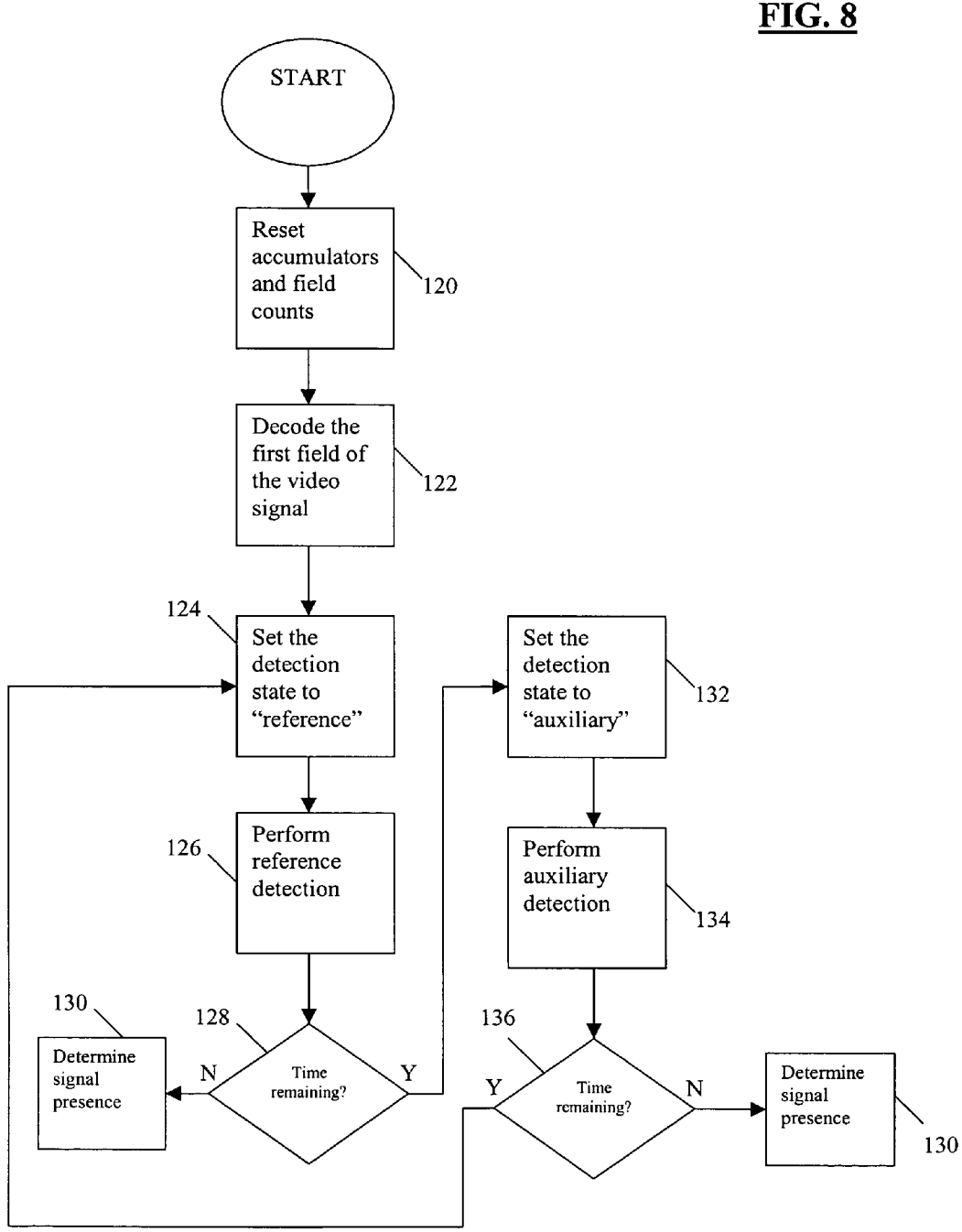
FIG. 8 is a flowchart of a first detecting method of the present invention.

Referring to FIG. 8, a first embodiment of detecting signal presence is shown to comprise a step 120 where the detector resets an unencoded field count, an unencoded signal strength accumulator, an encoded field count and an encoded signal strength accumulator. The unencoded and encoded field counts track the number of fields read while detection state 100 was set to reference field 102 and auxiliary field 104 respectively as described in greater detail below. The unencoded and encoded signal strength accumulators accumulate the decoded signal strength for reference field 102 and auxiliary field 104 respectively as described in greater detail below.

The detector at step 122 decodes the first field of the video signal 18 (e.g., video signal 18 is likely to be modulated video signal 22 as is determined according to the detection process), which is used to provide a reference to the next field as described below. Preferably, the detector determines the signal strength of a particular field by calculating and accumulating the line to line differences in the field, however alternate methods may be used when a different encoding method is used.

The detector sets the initial position of detection state 100 to reference field 102 (i.e., the likely unencoded field) at step 124. Thereafter, the detector at step 126 performs reference detection as will be described in greater detail below.

The detector at decision point 128 determines if there is time remaining in the interval (i.e., there are more fields left in the interval). If no, the detector at step 130 determines whether auxiliary signal 20 is present within video signal 18 in a process described in greater detail below. If yes, the detector at step 132 sets detection state 100 to auxiliary field 104. Thereafter, the detector at step 134 performs auxiliary detection as described in greater detail below.

Upon completion of step 134, the detector at step 136 determines if there is time remaining in the interval. If yes, the detector returns to step 124. If no, the detector at step 130 determines whether auxiliary signal 20 is present within video signal 18 in a process described in greater detail below. Upon completion of step 130, the detecting process of a first embodiment of the present invention is complete.

Figure 9:
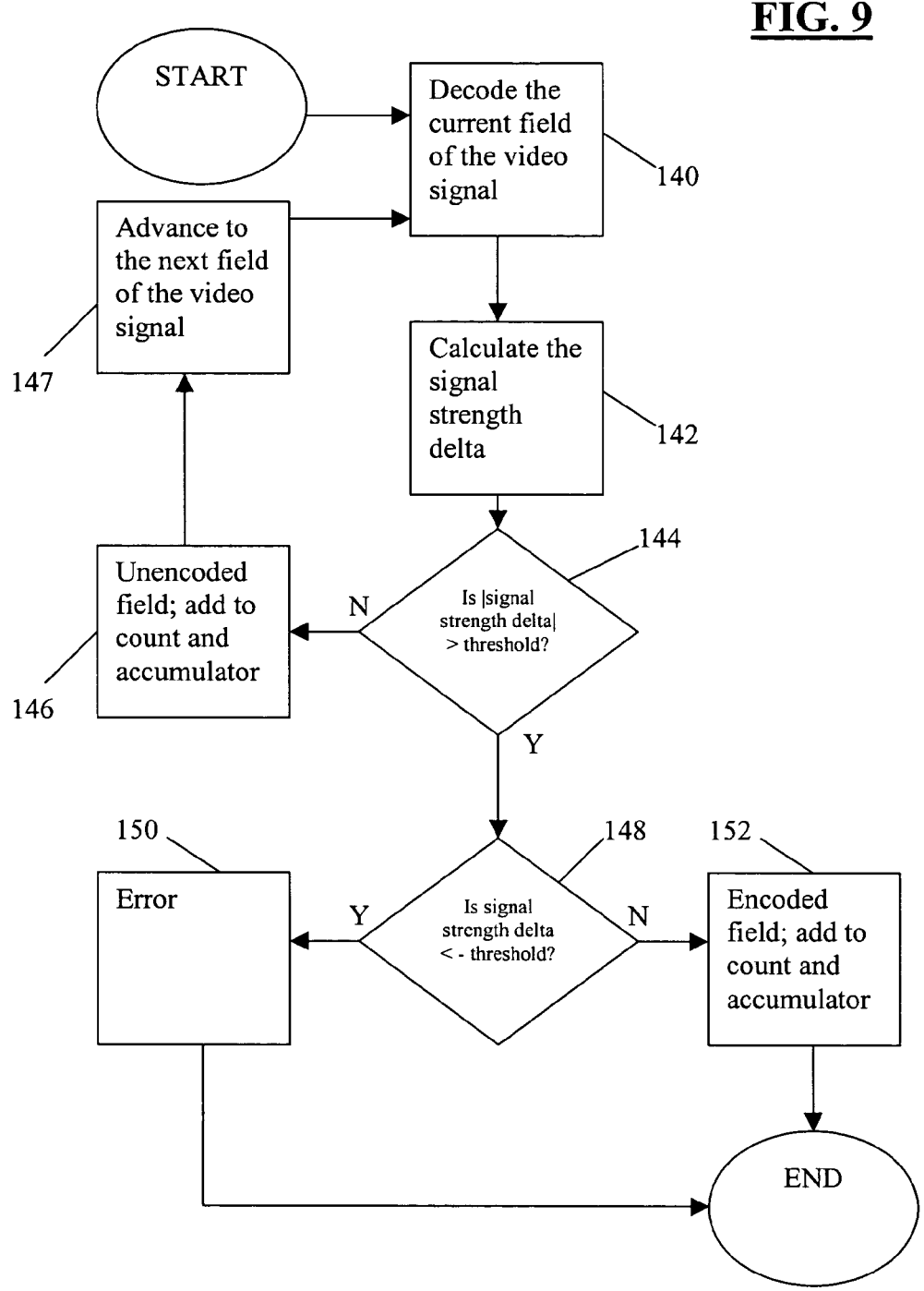
FIG. 9 is a flowchart of reference field detection of the present invention.

Referring to FIG. 9, the process of reference detection is shown to first comprise a step 140 where the detector decodes the current field of video signal 18 and thereby calculates the signal strength of the current field. Thereafter, the detector at step 142 calculates a signal strength delta by subtracting the signal strength of the previous field from the signal strength of the current field.

At decision point 144, the detector compares the absolute value of signal strength delta against a threshold, where the threshold is a cutoff signal strength value indicative of the signal strength at approximately a midway value between an encoded and unencoded field. If the signal strength delta is not greater than the threshold, then the detector at step 146 proceeds under the assumption that the current field is unencoded and increments the unencoded field count by one and the unencoded signal strength accumulator is increased by the signal strength of the current field. Thereafter, the detector at step 147 advances to the next field of video signal 18 and returns to step 140.

If the signal strength delta is greater than the threshold at decision point 144, then the detector proceeds to decision point 148 and compares the signal strength delta 216 to determine if it is less than the negative threshold 214. If it is less, then the detector at step 150 reports an error and may make an action as appropriate or desired based on the application, such as either returning a signal absence or taking no further action. If the signal strength delta is not less than the negative threshold, then the detector at step 152 adds the signal strength of the current field to the encoded signal strength accumulator and increments the encoded field count by one.

In an alternate embodiment the detector may skip optional error checking at decision point 148 and step 150 and proceed to step 152.

Figure 10:
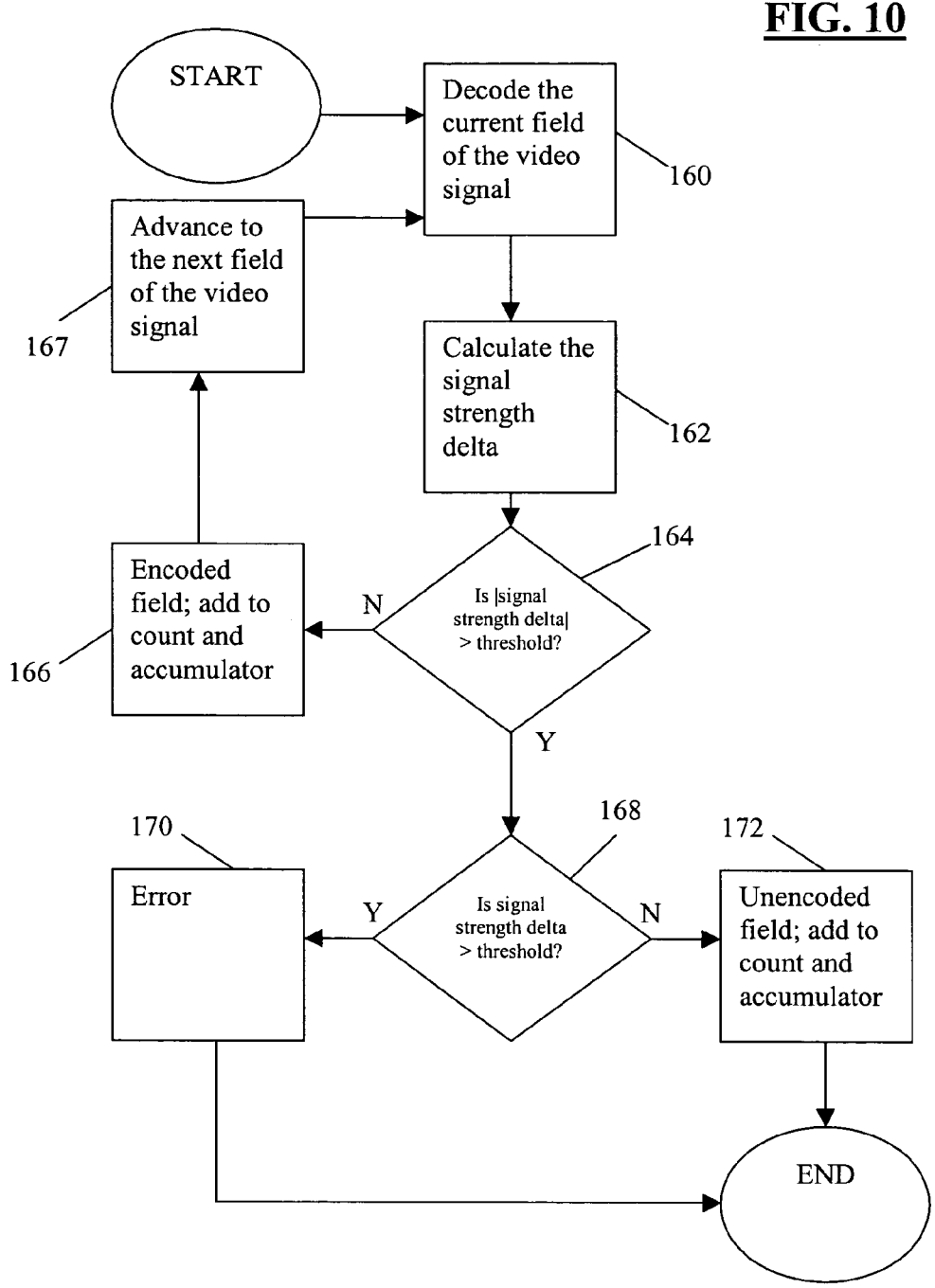
FIG. 10 is a flowchart of auxiliary field detection of the present invention.

Referring to FIG. 10, the process of auxiliary detection is shown to first comprise a step 160 where the detector decodes the current field of video signal 18 and thereby calculates the signal strength of the current field. Thereafter, the detector at step 162 calculates a signal strength delta by subtracting the signal strength of the previous field from the signal strength of the current field.

At decision point 164, the detector compares the absolute value of signal strength delta against the threshold. If the signal strength delta is not greater than the threshold, then the detector at step 146 proceeds under the assumption that the current field is encoded and increments the encoded field count by one and the encoded signal strength accumulator is increased by the signal strength of the current field. Thereafter, the detector at step 167 advances to the next field of video signal 18 and returns to step 160.

If the signal strength delta is greater than the threshold at decision point 164, then the detector proceeds to decision point 168 and compares the signal strength delta to determine if it is greater than the threshold. If it is greater, then the detector at step 170 reports an error. If not, then the detector at step 172 adds the signal strength of the current field to the unencoded signal strength accumulator and increments the unencoded field count by one.

It should be appreciated that in an alternate embodiment the detector may skip optional error checking at decision point 168 and step 170 and proceed to step 172.

Figure 11:
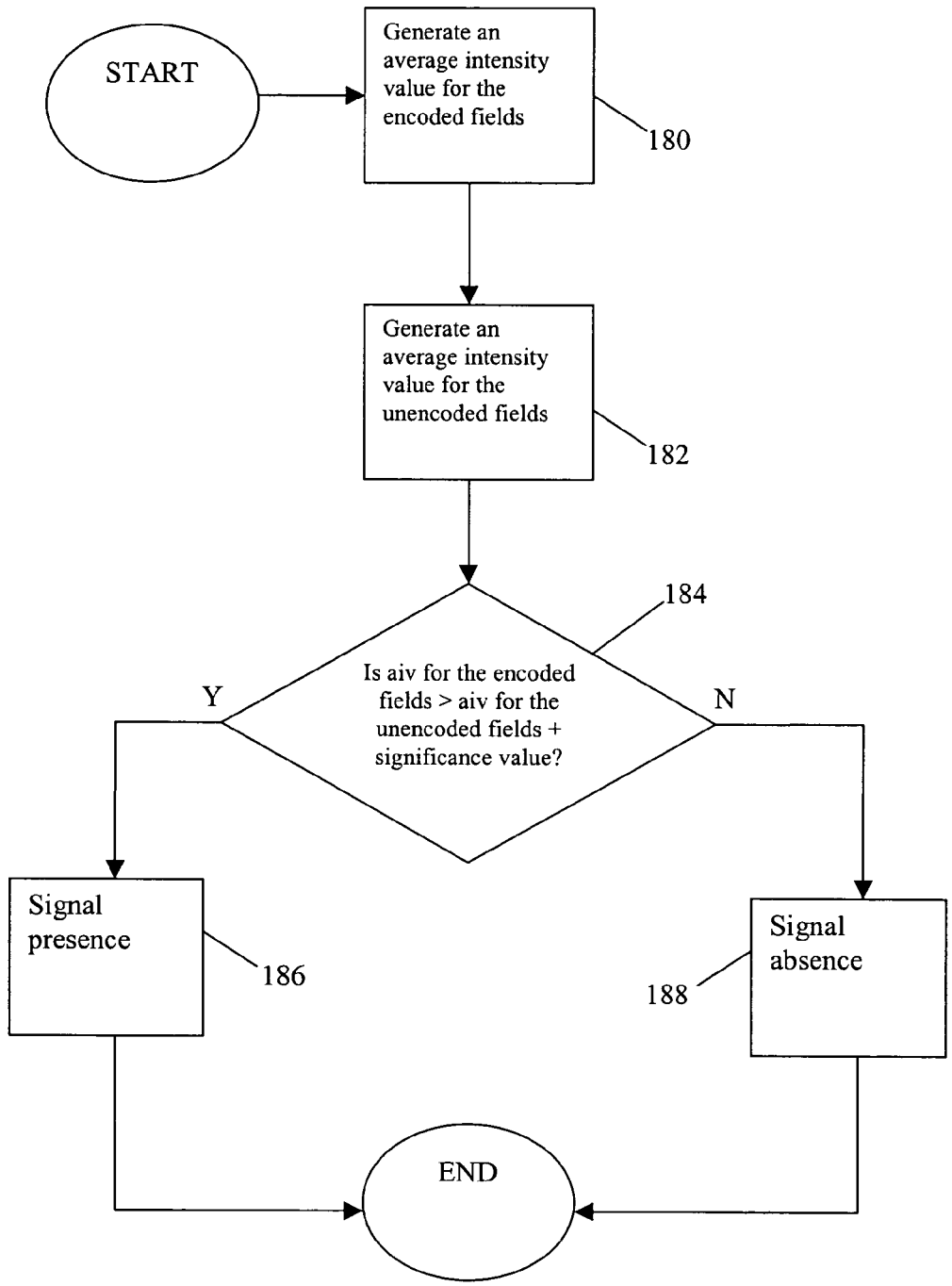
FIG. 11 is a flowchart of a method of detecting signal presence of the present invention.

Referring to FIG. 11, the process for detecting signal presence is shown to first comprise a step 180 where the detector generates an average intensity value for the encoded fields by dividing the current value of encoded signal strength accumulator by the encoded field count. Thereafter, the detector at step 182 generates an average intensity value for the unencoded fields by dividing the current value of unencoded signal strength accumulator by the unencoded field count.

The decoder at decision point 184 determines whether the encoded frames intensity average is greater than the nonencoded frames intensity average plus a significance value. If yes, the detector at step 186 determines that auxiliary signal 20 is present for the fields of video signal 18 and accordingly determining a signal presence for the fields over the interval. If no, the detector at step 188 determines that auxiliary signal 20 is not present for the fields of video signal 18 and accordingly determining a signal absence for the fields over the interval.

Figure 12:
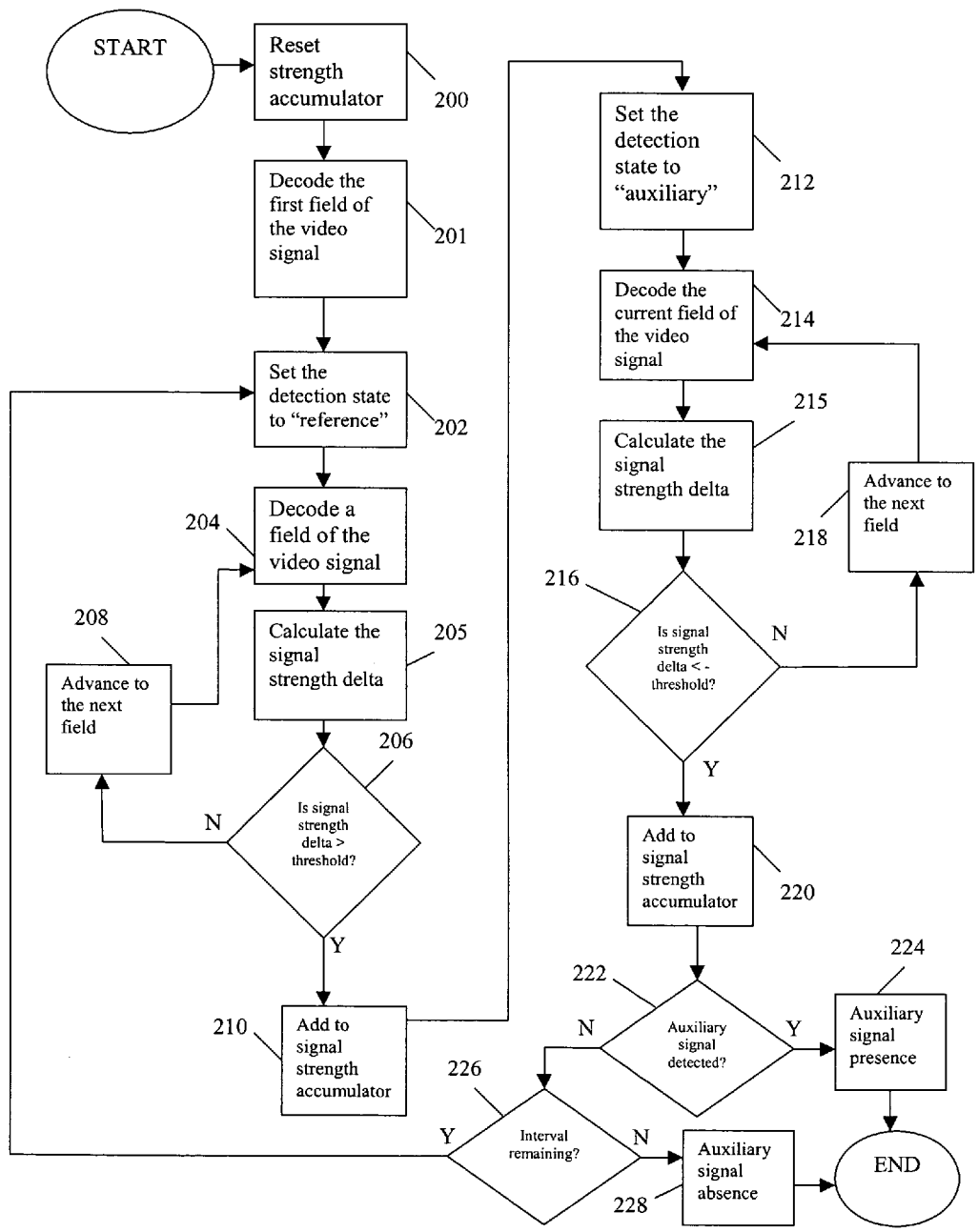
FIG. 12 is a flowchart of a second detecting method of the present invention.

Referring to FIG. 12, a second and preferred embodiment of the detection method of the present invention that tracks signal strength deltas during transitions from one type of field to another instead of tracking the signal strengths as described in the embodiment above is shown to first comprise at a step 200 the detector resetting the strength accumulator. Thereafter, at step 201 the detector decodes the first field of video signal 18.

The detector at step 202 sets detection state 100 to reference field 102 and advances to the next field. The detector then decodes the current field of video signal 18 at step 204. Thereafter, the detector at step 205 subtracts the signal strength of the previous field from the signal strength of the current field to generate a signal strength delta.

The detector at decision point 206 determines whether the signal strength delta is greater than a detection threshold. If no, the detector determines that no transition from the unencoded field to an encoded field has occurred and the detector advances to the next field at step 208 and returns to step 204.

If the signal strength delta is greater than the threshold, then the detector determines that the previous field was not encoded and the current field is encoded and thus at step 210 adds the signal strength delta to the signal strength accumulator. Thereafter, the detector at step 212 sets detection state 100 to auxiliary field 104 and advances to the next field of video signal 18.

The detector at step 214 decodes the current field of video signal 18 to determine its signal strength. Thereafter, the detector at step 215 generates the signal strength delta by subtracting the signal strength of the previous field from the signal strength of the current field.

The detector at decision point 216 determines if the signal strength delta is less than the negative of the detection threshold. If no, the detector determines that no transition from the encoded field to the unencoded field has occurred and the detector advances to the next field at step 218 and returns to step 214. If yes, the detector adds the signal strength delta to the signal strength accumulator at step 220.

The detector at decision point 222 determines whether auxiliary signal 20 has been detected in video signal 18 by determining whether the total value of the signal strength accumulator exceeds a required signal strength amount. If yes, the detector returns a signal presence at step 224. If no, the detector at decision point 226 determines if there is time remaining in the detection interval. If there is time remaining, the detector returns to step 202. If no time remains, the detector returns a signal absence at step 228. Upon completion of step 224 or step 228, the detection process is complete.

The foregoing detection method is not shown to comprise error detecting, but the error detecting steps shown in the first detection may also be used with the foregoing detection method.

Figure 13:
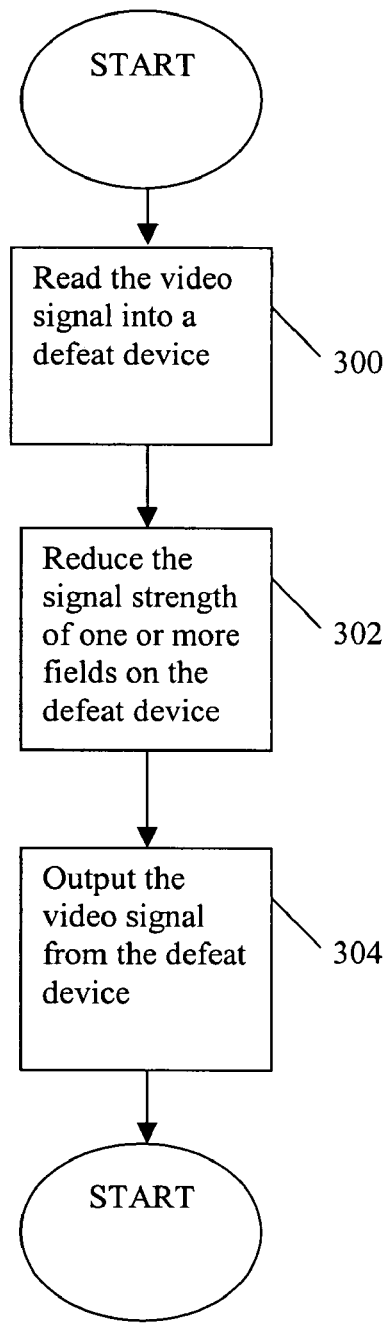
FIG. 13 is a flowchart of a method for defeating the encoding and detection method of the present invention.

Referring to FIG. 13, a method for defeating the encoding and detection of the present invention is shown to first comprise a step 300 where modulated video signal 22 is read into a defeat device, where the defeat device has various components of encoder 12 and/or inline detector 13 as need to carry out the steps of defeating the presence of auxiliary signal 20 according to the present method. The defeat device at step 302 reduces the signal strength of one or more fields of modulated video signal 22 in an effort to prevent the detector from receiving an unaltered modulated video signal 22. It should be appreciated that a user may try to alter modulated video signal 22 for unauthorized purposes, such as to remove the user's limited authority to reproduce modulated video signal 22. Thereafter, the defeat device at step 304 outputs an altered modulated video signal 22.

It should be understood from the foregoing that, while particular embodiments of the invention have been illustrated and described, various modifications can be made thereto without departing from the spirit and scope of the invention. Therefore, it is not intended that the invention be limited by the specification; instead, the scope of the present invention is intended to be limited only by the appended claims.

We claim:

1. A method for detecting a signal presence in a modulated video signal, the modulated video signal having a plurality of encoded fields and a plurality of unencoded fields, the plurality of unencoded fields having a first field, the method comprising:

decoding the first field of the modulated video signal to determine a previous field signal strength;

comparing the previous field signal strength with a current field signal strength for the plurality of unencoded fields and the plurality of encoded fields by alternating between a reference detection step and an auxiliary detection step to generate an encoded average intensity value for the plurality of the encoded fields and an unencoded average intensity value for the plurality of the unencoded fields; and verifying a signal presence in the modulated video signal by determining whether the encoded average intensity value is greater than the unencoded average intensity value plus a significance value in the modulated video signal.

2. The method of claim 1, wherein the reference detection step comprises:

decoding a current field of the modulated video signal to determine the current field signal strength;

calculating a signal strength delta by subtracting the previous field signal strength from the current field signal strength;

incrementing an unencoded field count, adding the current field signal strength to the unencoded signal strength accumulator, advancing to a next field of the modulated video signal, setting the previous field signal strength to the current field signal strength and returning to the step of decoding the current field of the modulated video signal when absolute value of the signal strength delta is not greater than a threshold; and incrementing an encoded field count and adding the current field signal strength to the encoded signal strength accumulator when absolute value of the signal strength delta is greater than the threshold.

3. The method of claim 2, wherein the step of decoding the current field of the modulated video signal comprises calculating and accumulating line to line differences of the current field.

4. The method of claim 1, wherein the auxiliary detection step comprises:

decoding a current field of the modulated video signal to determine the current field signal strength;

calculating a signal strength delta by subtracting the previous field signal strength from the current field signal strength;

incrementing an encoded field count, adding the current field signal strength to the encoded signal strength accumulator, advancing to a next field of the modulated video signal, setting the previous field signal strength to the current field signal strength and returning to the step of decoding the current field of the modulated video signal when absolute value of the signal strength delta is not greater than a threshold; and incrementing an unencoded field count and adding the current field signal strength to the unencoded signal strength accumulator when absolute value of the signal strength delta is greater than the threshold.

5. The method of claim 4, wherein the step of decoding the current field of the modulated video signal comprises calculating and accumulating line to line differences of the current field.

6. A method for detecting a signal presence in a modulated video signal over a time interval, the modulated video signal having a plurality of encoded fields and a plurality of unencoded fields, the method comprising:
  decoding a first field of the modulated video signal;
  alternating between a reference detection step and an auxiliary signal step to generate a signal strength accumulation for the time interval or until a signal presence is returned; and
  verifying a signal presence in the modulated video signal when a signal strength accumulator is greater than a required signal strength amount.

7. The method of claim 6, wherein the reference detection step comprises:
  advancing to a next field of the modulated video signal;
  decoding the current field of the modulated video signal to determine a current field signal strength;
    calculating a signal strength delta by subtracting a previous field signal strength from the current field signal strength;
    returning to the step of advancing to the next field when the signal strength delta is not greater than a threshold; and
    adding the signal strength to a signal strength accumulator when the signal strength delta is greater than the threshold.

8. The method of claim 6, wherein the auxiliary detection step comprises:
  advancing to the next field of the modulated video signal;
  decoding the current field of the modulated video signal to determine a current field signal strength;
  calculating a signal strength delta by subtracting a previous field signal strength from the current field signal strength;
  returning to the step of advancing to the next field when the signal strength delta is not greater than a threshold; and
  adding the signal strength to a signal strength accumulator when the signal strength delta is greater than the threshold.

9. A system for selectively enabling the recording of a video signal on a signaled device by use of a signal absence or a signal presence; the system comprising:
  a broadcast source;
  a decoder, the decoder including a signal strength delta means for determining whether an auxiliary signal is present the video signal and an auxiliary output for outputting in the form of a signal presence or a signal absence results of whether the auxiliary signal is present in the video signal; and
  a signaled device with input means for receiving the signal presence or the signal absence wherein the signal strength delta means comprises; means for decoding a first field of the modulated video signal; means for alternating between a reference detection step and an auxiliary signal step to generate a signal strength accumulation for the time interval or until a signal presence is returned; and means for verifying a signal presence in the modulated video signal when a signal strength accumulator is greater than a required signal strength amount.

10. The system of claim 9, wherein the signaled device is a video cassette recorder.

11. The system of claim 9, wherein the signaled device is a digital video disc recorder.

12. The system of claim 9, wherein the signaled device is a hard disk video recorder.

13. The system of claim 9, wherein the broadcast source is a digital video disc player coupled with a digital video disc.

14. The system of claim 9, wherein the broadcast source is a video cassette player coupled with a video cassette.

15. The system of claim 9, wherein the broadcast source is a hard disk video recorder.

16. A method for altering a modulated video signal comprising:
  reading a modulated video signal into a defeat device, the modulated video signal including auxiliary signal;
  reducing signal strength of one or more fields of the modulated video signal on the defeat device to create an altered video signal; and
  outputting the altered video signal from the defeat device, wherein a presence of the auxiliary signal in the altered video signal is defeated and is undetectable in the altered video signal.

17. The method of claim 16, wherein the auxiliary signal includes at least one of a signal presence, a signal absence, or combinations thereof.

18. A method for altering a modulated video signal comprising:
  reading a modulated video signal into a defeat device, the modulated video signal including auxiliary signal;
  reducing signal strength of one or more fields of the modulated video signal on the defeat device to create an altered video signal; and
  outputting the altered video signal from the defeat device, wherein a presence of the auxiliary signal in the altered video signal is defeated and the auxiliary signal is undecodable in the altered video signal.

19. The method of claim 18, wherein the signal strength of a particular field of the one or more fields is based on the line to line intensity differences of the particular field.

* * * * *